United States Patent [19]

Kargol et al.

[11] Patent Number: 5,707,035
[45] Date of Patent: Jan. 13, 1998

[54] VEHICLE SEAT ADJUSTER

[75] Inventors: James A. Kargol, Farmington Hills; Robert W. Jones, Novi; Bruce A. Hiemstra; Marc D. Hewko, both of Ann Arbor, all of Mich.; Yannis Poulos, Toledo, Ohio; Ronald R. Siegrist, Grass Lake, Mich.; Wee Tzee Gam, Troy, Mich.; David W. Husted, Ann Arbor, Mich.; Chester S. Fudala, Troy, Mich.

[73] Assignee: Hoover Universal, Inc., Plymouth, Mich.

[21] Appl. No.: 298,890

[22] Filed: Aug. 31, 1994

[51] Int. Cl.⁶ ................................................. F16M 13/00
[52] U.S. Cl. ................................. 248/429; 248/430
[58] Field of Search ........................... 248/429, 430; 428/461; 384/55, 913, 907.1; 184/5, 100

[56] References Cited

U.S. PATENT DOCUMENTS

| | | |
|---|---|---|
| 2,336,433 | 12/1943 | Wiona .................... 248/430 |
| 3,637,497 | 1/1972 | Fitz Simmons ............ 252/29 |
| 4,040,591 | 8/1977 | Pickles . |
| 4,223,947 | 9/1980 | Cremer . |
| 4,331,313 | 5/1982 | Pickles . |
| 4,478,383 | 10/1984 | Urai .................... 248/430 X |
| 4,511,187 | 4/1985 | Rees .................... 248/430 X |
| 4,621,784 | 11/1986 | Kaesling et al. ............ 248/430 |
| 4,717,194 | 1/1988 | Ota et al. ............... 248/430 X |
| 4,924,584 | 5/1990 | Harney . |
| 4,940,285 | 7/1990 | Suzuki et al. ............ 248/430 X |
| 5,188,329 | 2/1993 | Takahara ................ 248/430 |
| 5,299,853 | 4/1994 | Griswold et al. . |
| 5,313,916 | 5/1994 | Murphy .................. 384/612 X |

OTHER PUBLICATIONS

"Information About Specialty Lubricants", Specification Note, 1991, Dow Corning Corporation, Midland Michigan.
"New Product Information Molycoat D 31 Anti-friction Coating", product form No. 65-027-92, Dow Corning Corporation, Midland Michigan.

Primary Examiner—Leslie A. Braun
Assistant Examiner—Gwendolyn W. Baxter
Attorney, Agent, or Firm—Harness, Dickey & Pierce, P.L.C.

[57] ABSTRACT

A power seat adjuster for bucket type vehicle seats includes inboard and outboard track assemblies each including a fixed lower section, a movable upper or movable section and a precision sliding interface including roller bearings between the moving upper track and the fixed lower track, the surfaces of the tracks that are engaged by the roller bearings being crowned to provide a bearing surface that is slightly convex when the seat is unoccupied but which becomes nearly flat when the seat is occupied, and the bearing surfaces of the track being coated with a multi-layer dry film lubricant including a base coating of an anti-friction material and a top coating of an anti-stick material. The power seat adjuster includes screw drive mechanisms for providing horizontal fore-and-aft adjustment, vertical up-and-down adjustment and adjustment in the inclination of the seat back, with the length of travel being limited by travel limit stops that include anti-jam mechanisms which are adapted to reduce the breakaway torque required to move the drive screws of the screw drive mechanisms away from either end position.

8 Claims, 9 Drawing Sheets

VEHICLE SEAT ADJUSTER

BACKGROUND OF THE INVENTION

This invention relates to seat assemblies for motor vehicles, and more particularly to seat adjusters for vehicle seat assemblies.

Seat adjusters for vehicle seat assemblies include track mechanisms which support the vehicle seat at each side of the seat and provide for adjustment in the positioning of the seat. The track mechanisms include upper and lower tracks. The lower track is fixed to the floor of the vehicle and the upper track is supported on the lower track and adapted for manual movement, or to be motor driven, relative to the lower track to provide fore-and-aft adjustment in the position of the seat. In addition, many seat adjusters also provide up and down adjustment and independent tilting of the front and rear of the seat and tilting of the back to accommodate a wide variety of drivers.

To facilitate horizontal movement and provide smooth adjustment, bearing assemblies including roller bearings have been proposed for the track mechanisms of seat adjusters. The roller bearings provide a smooth, precise guide between the moving upper track and the fixed lower track. However, under load, the tracks tend to bow at their centers so that there is less roller to track contact at the center of the rollers, decreasing lubricant effectiveness and resulting in accelerated wearing of the tracks, particularly at the edges of the rollers. This is particularly true when the sliding interface includes steel roller bearings and the tracks are made of a light weight material such as aluminum. In recent years, tracks made of lightweight metal, such aluminum, have been introduced. The use of aluminum provides significant weight savings which can be about 10% less than a conventional steel track system.

Another consideration is that in most seating adjusters presently available, the mating moving parts are lubricated with grease. The use of grease on mating parts can result in the transfer of grease to occupants of the passenger compartment of the vehicle if a pant cuff or coat hem should inadvertently contact a greased surface. Various types of dry lubricants are known, such as polytetrafluoroethylene, molybdenum disulfide, graphite, and the like. Although polytetrafluoroethylene has a low coefficient of friction, its use is limited to load conditions that are substantially lower than those experienced in the operation of seat track mechanisms. Molybdenum disulfide is suitable for use under high load conditions, but the high hardness binder in the coating promotes roller squeaking due to the roller sliding over the hard dry lubricant surface, resulting in undesirable noise. Moreover, it has been found that in a mixture of polytetrafluoroethylene and molybdenum disulfide, there is a weakening of the binder of the molybdenum disulfide which promotes build up of dry lubricant flakes that prevent proper travel of the steel rollers in the tracks.

In most power seat adjusters, horizontal, vertical and recliner adjustment is provided by screw drive mechanisms which include a drive screw and a drive nut. The drive nuts of horizontal, vertical and recliner screw drive mechanisms of currently available seat adjusters are formed from metal tubes. Although the drive nuts may include a threaded plastic insert for receiving the associated drive screw to eliminate the metal-to-metal connection between the drive screw and the drive nut, known screw drive mechanisms provide metal-to-metal connections between the vertical drive nut and the coupling mechanism that connects the drive nut to the seat support and between the recliner drive nut and the seat back frame. This metal-to-metal connection results in noise, higher friction and reduced efficiency caused by relative movement between these parts during adjustment in the vertical positioning of the seat or in adjustment of the inclination of the seat back.

In power seat adjusters, adjustment of the horizontal positioning of the vehicle seat assembly is provided using a direct drive for one track mechanism, such as the outboard track, and a slave drive for the inboard track. The drive screw of the horizontal drive mechanism of the outboard track is connected through a transmission unit directly to the motor and the drive screw mechanism of the inboard track is connected to the drive motor through a transmission unit and a flexible shaft. In known power seat adjusters, travel limit stops are provided both on the master drive screw drive mechanism and on the slave screw drive mechanism. Due to manufacturing tolerances, if the slave drive mechanism reaches its end of travel stop before the master drive mechanism reaches its end of travel stop, the drive motor can continue to drive the master drive mechanism because the flexible shaft that connects the slave drive mechanism to the motor can twist, resulting in over travel in the outboard track section after the inboard track section has reached its end of travel stop, a condition referred to as horizontal matchboxing. A further consideration is that because there is high energy running into a stop, the screw drive mechanisms jam when they reach their two extreme stop positions and the drive screw mechanisms lock up. Consequently, a greater force is required to overcome frictional forces to reverse the movement drive screws in moving the drive screw away from its extreme stop positions.

SUMMARY OF THE INVENTION

The present invention provides a seat adjuster for vehicle seat assemblies which is characterized by smooth operation, low noise and low cost. The seat adjuster includes a pair of track assemblies each including a lower track and an upper track. Horizontal movement is facilitated by precision sliding interfaces each comprised of ball bearings and roller bearings. The weight of the vehicle seat and its occupant is carried by the roller bearings, while the ball bearings provide a smooth, precise guide between the moving upper track and the lower track that is anchored to the vehicle's frame. Also, the ball bearings provide lateral stability. In accordance with the invention, the bearing surfaces of the tracks that are engaged by the roller bearings are crowned so that the bearing surfaces have a slightly convex profile when the seat is unoccupied. Consequently, under the loading conditions that exists when the seat is occupied, the bearing surfaces approach a flat so, allowing the roller bearings to be maintained in contact with the bearing surfaces, distributing the load more evenly across the width of the tracks. In addition, the bearing surfaces are coated with a multi-layer dry film coating that includes a base coat of an anti-friction coating and a top coating of an anti-stick material. The ball and roller bearings ride on this greaseless surface providing smooth, low-noise operation. The addition of the separate non-stick top coating permits the use of a higher hardness binder in the base coat which provides resistance to flaking and with the non-stick top coating preventing roller sliding to prevent squeaking. Moreover, use of a dry film lubricant at least on the tracks of the seat adjuster substantially eliminates the risk of pant cuffs or coat hems contacting greased surfaces.

The screw drive mechanisms of the horizontal, vertical and recliner drive assemblies include molded plastic drive nuts that have a molded-in metal insert. The molded plastic drive nuts minimize metal-to-metal contact between mating surfaces, thereby increasing efficiency and minimizing noise during operation of the seat adjustment mechanisms. The travel limit stops of the horizontal drive, the vertical drive and the recliner drive assemblies include anti-jamming mechanisms that lower the breakaway torque from either end position of the drive screw, preventing jamming when the screw drive mechanism reaches its extreme stops. The anti-jamming mechanisms include a bearing assembly interposed between the rotating parts of the screw drive mechanism to minimize flat contact areas between the drive screw and the travel limit stop. In addition, the travel limit stop mechanism of the horizontal drive mechanism is deployed in a manner so as to eliminate the possibility of matchboxing. The travel limit stop for the recliner drive includes a radial stop mechanism including a guide collar that floats on the recliner drive screw and cooperates with a stop member that is fixed to the recliner drive screw to define a travel limit stop when the recliner drive screw is driven to its full extended position. The stop member includes a radial projection that is moved into interference with a radial projection of the guide collar so that a positive stop position is defined at the extreme travel limit stop position, with minimal metal-to-metal contact between the two members of the radial stop mechanism.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating an understanding of the invention, there is illustrated in the accompanying drawings preferred embodiments thereof, from an inspection of which, when considered in connection with the following description, the invention, its construction and operation, and many of its advantages will be readily understood and appreciated.

DESCRIPTION OF PREFERRED EMBODIMENTS

Figure 1:
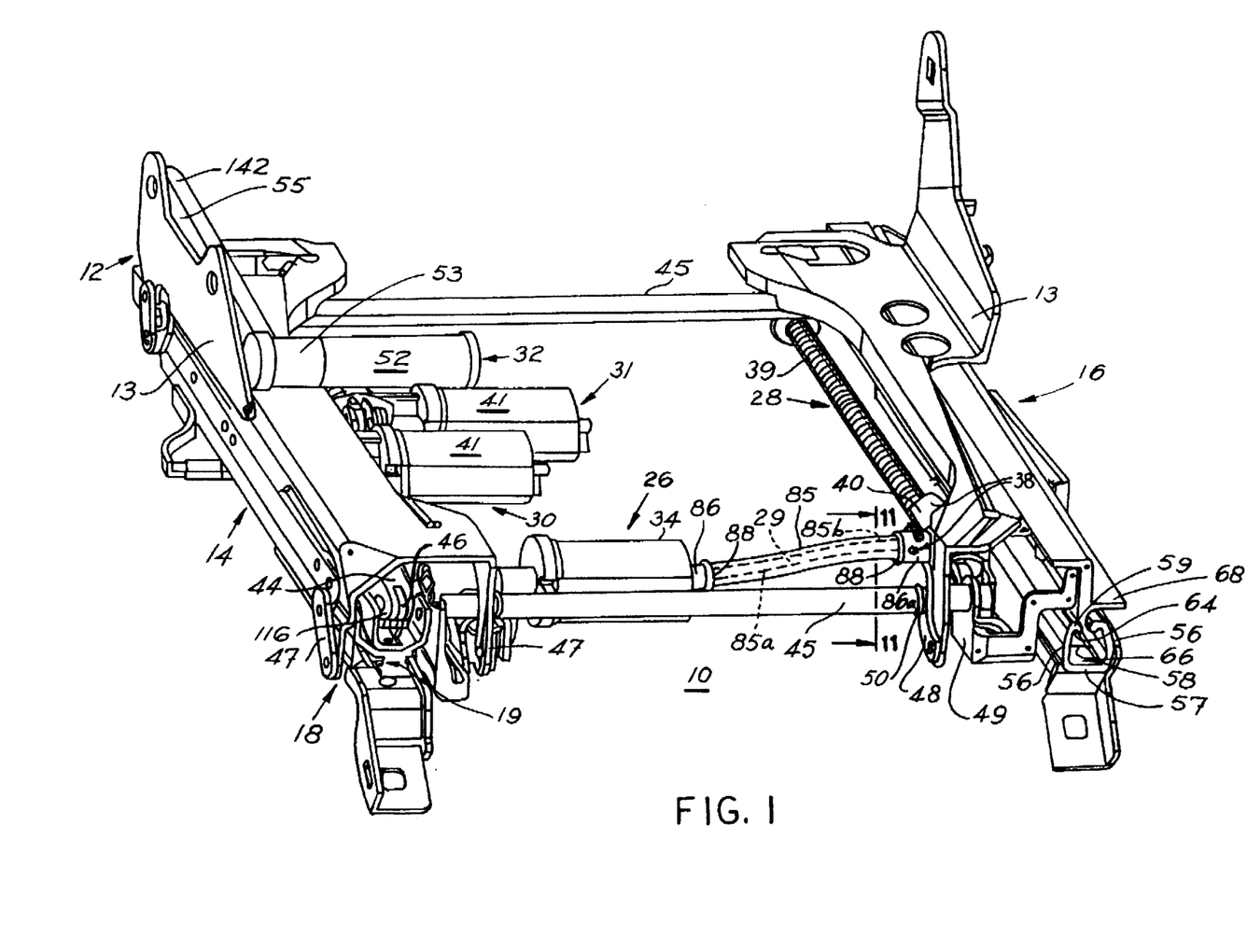
FIG. 1 is an isometric view of the vehicle seat adjuster provided by the present invention, viewed from the front outboard corner.
Figure 2:
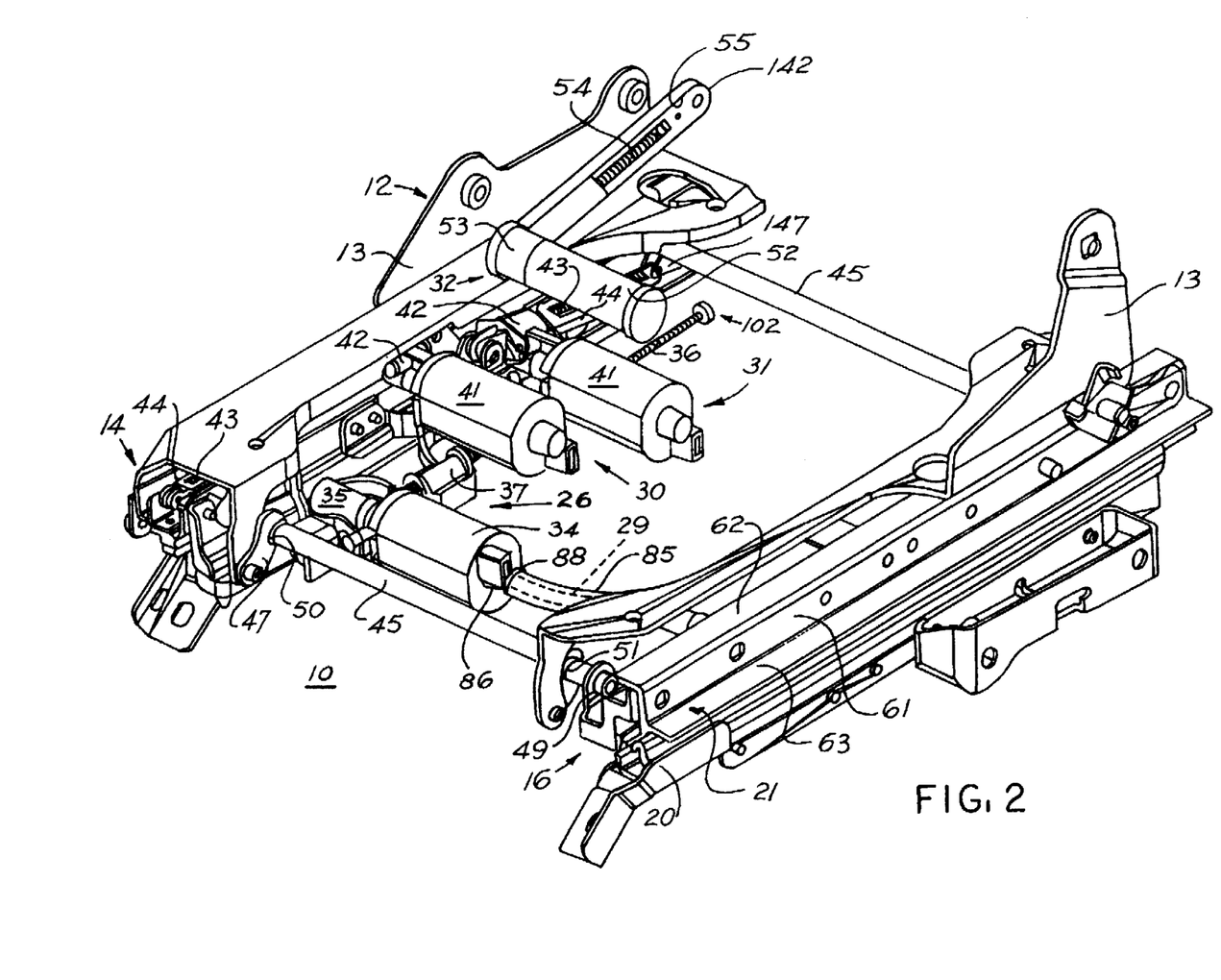
FIG. 2 is an isometric view of the vehicle seat adjuster of FIG. 1, but viewed from the front inboard corner.

Referring to FIGS. 1 and 2, the seat adjuster for a vehicle seat assembly provided by the present invention is designated generally at 10. The seat adjuster 10 is associated with a bucket type vehicle seat (not shown) having a seat portion and a reclineable seat back, but features of the seat adjuster may be incorporated into a seat adjuster adapted for use with bench type seats. The seat adjuster includes an upper frame sub-assembly 12 which is mounted on an outboard track sub-assembly 14 and an inboard track sub-assembly 16. The upper frame sub-assembly 12 includes mounting brackets 13 which facilitate mounting of the vehicle seat on the seat adjuster.

Figure 3:
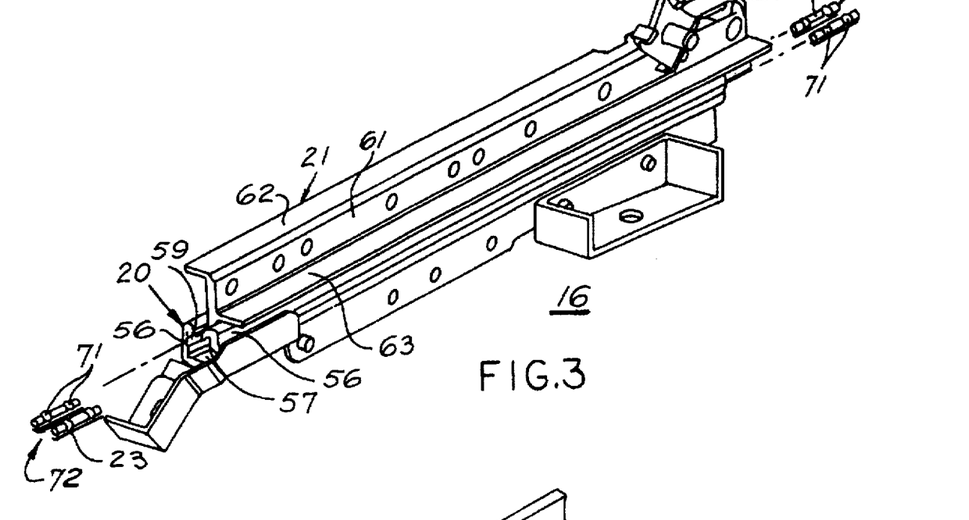
FIG. 3 is an isometric view of the inboard track sub-assembly of the vehicle seat adjuster.

Referring additionally to FIG. 3, which is an isometric view of the inboard track sub-assembly 16, the inboard track sub-assembly 16 includes a lower track 20 that is adapted to be mounted on the floor of the vehicle, secured to the frame of the vehicle, and an upper track 21 that is supported on the lower track and movable relative to the lower track. The upper track 21 is supported on the lower track 20 for fore-and-aft movement relative to the fixed lower track. Horizontal movement is facilitated by a precision sliding interface which includes a front bearing and retainer assembly 23, shown in FIG. 5, and a rear bearing and retainer assembly 24. The bearing assemblies 23 and 24 are interposed between the upper and lower tracks. Similarly, the outboard track sub-assembly 14 includes a lower track 18 that is adapted to be mounted on the floor of the vehicle, secured to the frame of the vehicle, an upper track 19 that is supported on and movable relative to the lower track, and front and rear bearing and retainer assemblies (not shown).

Referring to FIGS. 1 and 2, the seat adjuster 10 includes a horizontal drive mechanism which includes a master drive portion 26 and a slave drive portion 28, a front vertical drive mechanism 30, a rear vertical drive mechanism 31, and a recliner drive mechanism 32. The horizontal drive mechanism provides fore and aft movement for the upper support frame 12. The front and rear vertical drive mechanisms 30 and 31 provide independent, substantially vertical adjustment of the front and rear edges of the upper seat frame to provide vertical and tilt adjustment. The recliner drive mechanism 32 provides pivoting movement of the seat back, permitting adjustment in the angle of inclination of the seat back (not shown).

The master drive portion 26 of the horizontal drive mechanism is associated with the outboard side of the vehicle seat and includes a drive motor 34, a transmission unit 35, a drive screw 36 and a horizontal drive nut 37. The slave drive portion 28 of the horizontal drive mechanism is associated with the inboard side of the vehicle seat and is slaved to the master drive portion 26 by a flexible drive shaft 29 and includes a transmission unit 38, a drive screw 39 and a horizontal drive nut 40. The drive motor 34 is mounted oriented 90° relative to the drive screws 36 and 39 and the shaft of the drive motor is coupled to the drive screw 36 by transmission unit 35 and through flexible drive shaft 29 and transmission unit 38 to drive screw 39.

Figures 4, 6:
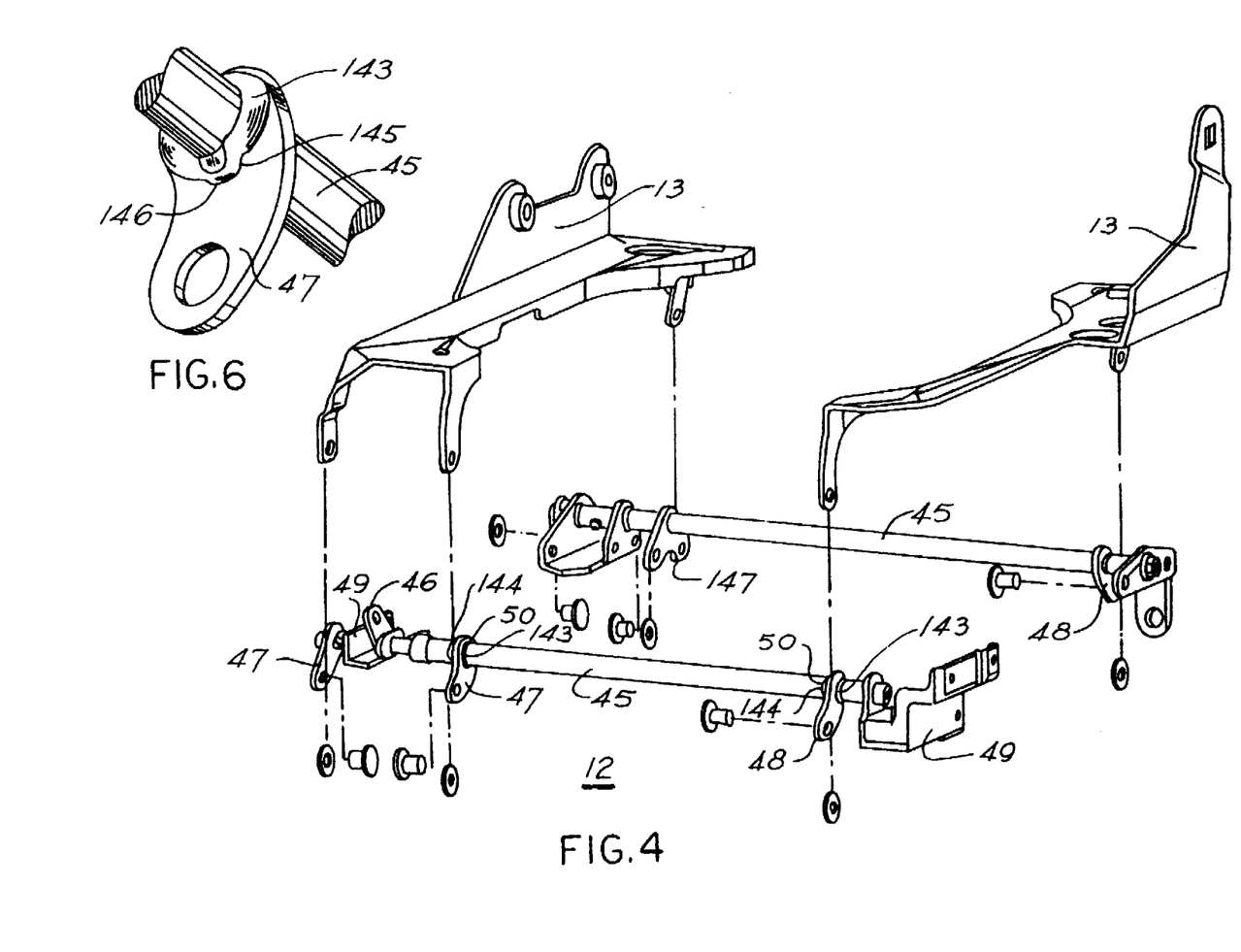
FIG. 4 is an exploded isometric view of the upper frame sub-assembly of the vehicle seat adjuster.
FIG. 6 is an enlarged fragmentary view of the torsion tube illustrating the mechanical joint that connects the link to the torsion tube.

Referring additionally to FIG. 4, the front vertical drive mechanism 30 includes a drive motor 41, a transmission unit 42, a drive screw 43, a vertical drive nut 44 and a dual link coupling mechanism, including a torsion tube 45 having a drive link 46, outboard coupling links 47 and an inboard coupling link 48 mounted thereon. The vertical drive nut 44 has a bifurcated end 116 (FIG. 16) having apertures 128 therethrough to facilitate connection to the drive link 46 as is known in the art.

The torsion tube 45 is pivotally mounted to the upper track by mounting brackets 49 at each end. The brackets 49 connect the ends of the torsion tube 45 to the upper track. The links 47 and 48 are secured to the torsion tubes by lock bead mechanical joints 50 which position the links in proper orientation to the torsion tube. The lock bead mechanical joints 50 include an upset potion 143 of the torsion tube on one side of the link and an upset potion 144 of the torsion tube on the other side of the link to prevent axial movement of link relative to the torsion tube. Each of the links, such as inboard coupling link 48 shown in FIG. 6, has a recess 145 that is adapted to receive material 146 of the torsion tube that is forced into the recess to provide a finger lock for preventing radial movement of the link relative to the torsion tube. In the alternative, the links can be welded to the torsion tubes.

The rear vertical drive mechanism 31 is similar to the front vertical drive mechanism 30, and accordingly corresponding elements of the rear vertical drive mechanism 31 have been given the same reverence numerals. In the rear vertical drive mechanism, the drive link and the outboard coupling links are a common member which has been given the reference numeral 147. In the exemplary embodiment, the drive motors 41 of the front and rear vertical drives are mounted oriented 90° relative to the drive screws 43, and the shafts the drive motors 41 are coupled to the drive screws 43 by transmission units 42.

The recliner drive mechanism 32 includes a drive motor 52, a transmission unit 53, a drive screw 54 and a recliner drive nut 55. The drive motor 52 is mounted to the frame sub-assembly 12 oriented at 90° relative to the drive screw 54 and is coupled to the drive screw by the transmission unit 53 which is mounted on the frame sub-assembly 12. The recliner drive nut 55 is carried by the recliner drive screw and is movable fore-and aft relative to the support as the recliner drive screw is rotated. The recliner drive nut has a mounting portion 142 that is adapted to be secured to the seat back frame beneath the pivot axis in the manner known in the art.

Track Sub-assembly

Referring to FIGS. 1–3 and 5, the lower track 20 and the upper track 21 of the inboard track sub-assembly 16 and the lower track 18 and the upper track 19 of the outboard track sub-assembly 14 are extruded from aluminum. The lower track 20 of the inboard track sub-assembly is an elongated member having a generally U-shaped cross-section with a pair of vertical sides 56 interconnected at their lower ends by a horizontal rail 57, the upper surface 58 of which defines the bearing surface for the lower track. The upper ends of the sides 56 are bent inwardly and downwardly, defining grooves 59 which open downwardly. The upper track 19 has an upright portion 61 having an inwardly directed upper flange 62, an outwardly directed flange 63 and a depending lower portion 64 which has a generally rectangular cross-section, but includes an inwardly directed, lateral channel 65 on each side. The channels 65 are arcuate in cross-section and extend the length of the upper track. The lower depending portion 64 of the upper track has a lower surface 66 which defines a bearing surface for the upper track. The upper inner corner of the depending portion defines a projection 68 which is received in the groove 59 of the lower track in interlocking relationship when the upper and lower tracks are assembled. When the upper and lower tracks are assembled together, the bearing surface 66 is located in an opposing spaced relationship with the bearing surface 58, defining a space in which the roller bearing and retainer assemblies 23 and 24 are located. The outboard track sub-assembly is similar to the inboard track sub-assembly, and accordingly will not be described in detail. The inboard and outboard track subassemblies include mounting flanges and mounting holes for connecting to the vehicle seat assembly and to the floor of the vehicle, and because such mounting is effected in the conventional manner and a detailed description of the connections and mounting is not necessary for an understanding of the invention.

Figure 5:
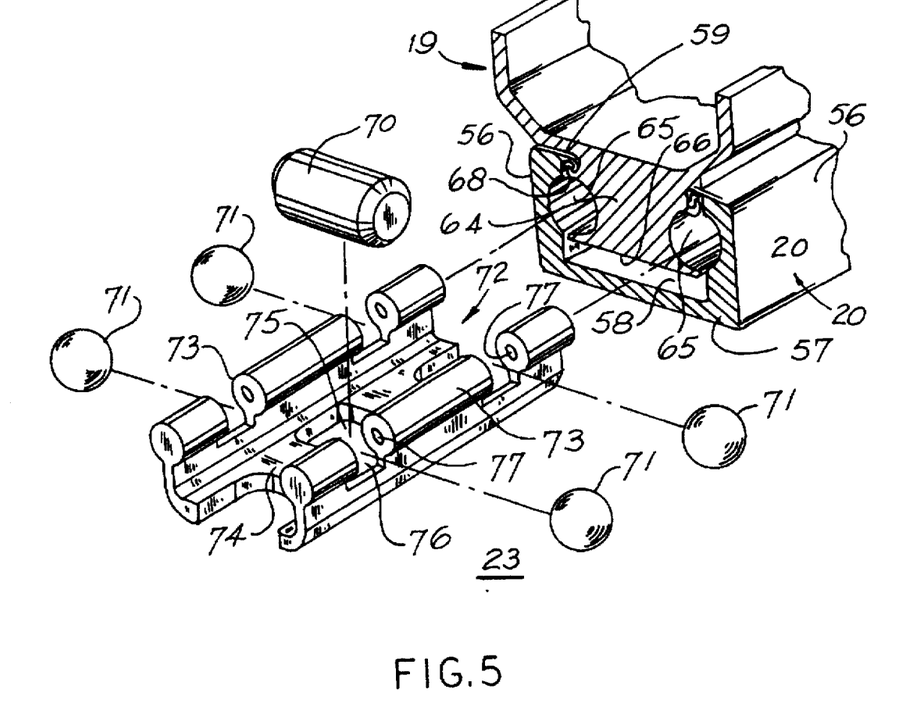
FIG. 5 is an isometric view of a roller bearing and retainer assembly of the outboard track sub-assembly.

Referring to FIGS. 1, 3 and 5, the front roller bearing and retainer assembly 23 includes a linear roller bearing 70, four ball bearings 71 and a bearing retainer 72. The roller bearing and the ball bearings are made of hardened steel. The bearing retainer 72 is molded from plastic.

The bearing retainer is generally U-shaped and has parallel opposing upright portions with cylindrical ball bearing support portions 73 at one end and a horizontally extending bottom wall 74 which includes a slot 75 for locating the roller bearing 70 which extends through the slot 75. The thickness of the bottom wall 74 is dimensioned so that the roller bearing 70 is centered in the slot when the upper and lower tracks are assembled, and the upper and lower portions of the roller bearing 70 extend, respectively, above and below the bottom wall 74 of the bearing retainer 72.

Each of the support portions 73 includes openings 76 with indentations 77 in the support portions 73 for receiving the ball bearings 71 in a snap-fit relation for retaining the ball bearings. The lateral width of the retainer corresponds to the inner width of the upper track. The rear roller bearing and retainer assembly 24 is similar to the front roller bearing and retainer assembly 23 but is slightly longer to accommodate two roller bearings 70. Accordingly, the elements of the rear roller bearing and retainer assembly have been given the same reference numerals as corresponding elements of the front roller bearing and retainer assembly. The bearing and retainer assemblies for the outboard track sub-assembly are similar to the those for the inboard sub-assemblies and accordingly will not be described.

The front and rear roller bearing and retainer assemblies are mounted on the depending portion 64 of the upper track 21 with the outer portions of the ball bearings 71 extending into the arcuate channels 65 defined in the side of the track. The roller bearings 70 are located in engagement with the bearing surface 58 of the lower track 18 and the bearing surface 66 of the upper track 19 when the upper and lower tracks are assembled together.

The weight of the vehicle seat and its occupant is carried by the roller bearings, while the ball bearings provide a smooth, precise guide between the moving upper track 21 and the lower track 20 that is anchored to the vehicle's frame. Also, the ball bearings provide lateral stability. The bearing retainers capture the ball bearings and the roller bearings and maintain the roller bearings and ball bearings in a given axial spacing in horizontal travel of the upper track relative to the lower track, providing stability and enabling the components of the roller bearing and retainer assemblies to run synchronized as the bearing retainer slides along the track.

Crown

Figure 7:
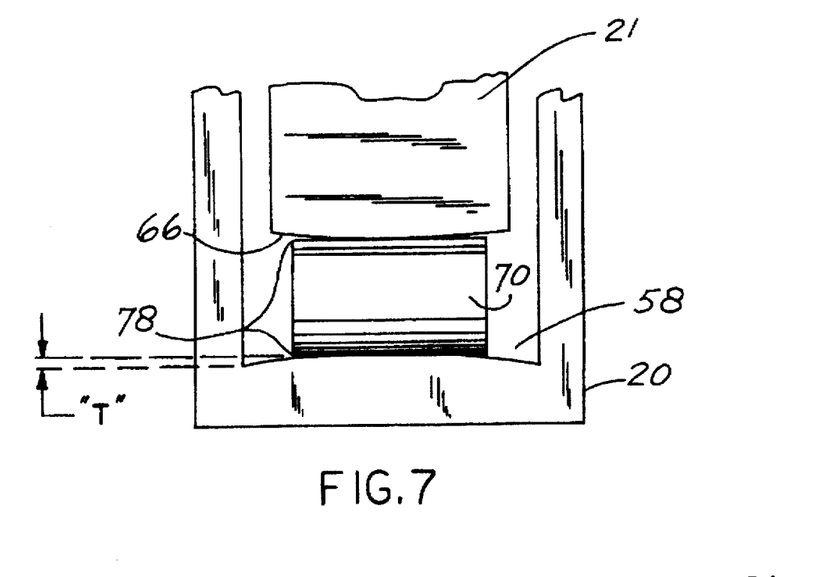
FIG. 7 is a simplified representation of the upper and lower tracks and the roller bearing and retainer assembly of a track sub-assembly, illustrating the convex crown on the roller bearing contact surfaces of the upper and lower tracks in accordance with the invention.

Referring to FIG. 7, the bearing surface 58 of the lower track 20 and the bearing surface 66 of the upper track 21 of the inboard track sub-assembly 16, as well as the bearing surfaces of the upper and lower tracks of the outboard track sub-assembly 14, are formed with a crown. The degree of crowning is dependent upon the geometry of the lower and upper tracks 20 and 21 and the roller bearings 70. In the exemplary embodiment, the crown is arcuate in shape and although its profile is exaggerated for purposes of illustration, in practice, the maximum thickness "T" of the crown 78 is in the range of about 0.05 millimeters to 0.14 millimeters at the center of the track, and preferably is approximately 0.07 millimeters at the center of the track under no load conditions, that is, when the vehicle seat is unoccupied.

The hardened steel roller bearings 70 are three times harder than the aluminum upper and lower tracks. It has been determined that for tracks having flat bearing surfaces, the forces exerted on the aluminum tracks by the linear roller bearings under load conditions, that is when the vehicle seat is occupied, cause the center of the tracks to bow outwardly away from the roller bearings, resulting in stress at the ends of the roller bearings. Because uniform contact is not provided between the roller bearings and the bearing surfaces of the upper and lower tracks under load conditions, the lubricant is less effective resulting in accelerated wear.

In accordance with the present invention wherein the bearing surfaces of the upper and lower tracks of the inboard and outboard sub-assemblies are formed with a crown, the crowned surfaces of the tracks approach a flat under load conditions, but do not become flat. Consequently, the roller bearings are maintained in contact with the bearing surfaces over substantially the entire length of the roller bearings, providing a more even distribution of the load on the bearing surfaces. An additional advantage is that the use of the crown on the bearing surfaces of the tracks eliminates the need for surface hardening the tracks.

Dry Lubricant Track Coating

Figure 8:
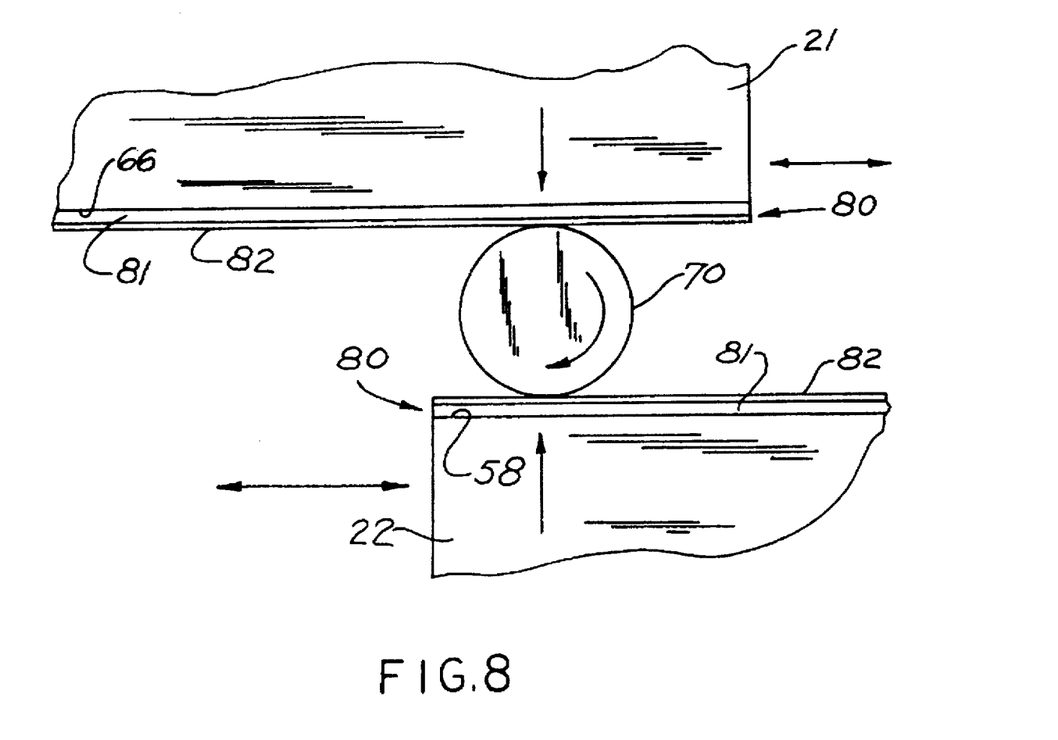
FIG. 8 is a simplified representation of the upper and lower tracks of a track sub-assembly and illustrating the dry lubrication coating that is provided on the contact surfaces of the tracks in accordance with the invention.

Referring to FIG. 8, the surfaces of the inboard and outboards tracks, including the bearing surfaces, are coated with a dry film lubricant 80. In accordance with one aspect of the invention, the dry film lubricant 80 is a multi-layer coating including one or more layers of a base coating 81 of an anti-friction material and one or more layers of a top coating 82 of an anti-stick material. In the exemplary embodiment, the base coating comprises a mixture of solid lubricants dispersed in organic binder waxes and solvents. One material suitable for this application is the bonded lubricant commercially available from Dow Corning Corporation under the tradename MOLYKOTE 106. This commercially available bonded lubricant contains solid lubricating pigments of molybdenum disulfide and graphite in a thermoset heat curable binder. When used as a dry film coating for bearing surfaces of tracks in a seat adjuster, the pigments provide lubrication under the high normal loads, in the thousands of psi, encountered during operation of the mechanism under the occupant load, and transmitted to the aluminum track through the roller bearings. These pigments produce low track operating efforts and smooth travel during cyclic track operation in service. The heat cured binder provides strength to retain the lubricating pigments at the aluminum alloy track-to-roller interface.

The top coating 82 consists of a material which provides a high tack, non-stick surface. Materials suitable for this application include paraffin, polyethylene or polytetrafluoroethylene. In the exemplary embodiment, the top coating consists of a clear polytetrafluoroethylene (PTFE), commonly referred to as TEFLON, with or without a binder.

The ball bearings and roller bearings of the bearing and retainer assemblies 23 and 24 (FIG. 3) roll on the greaseless surfaces of the tracks, providing substantially noise-free operation. The base coating 81 has the high load carrying capability that is required for this application, but testing has shown that in a rolling track operation in which one element rolls relative to the other, a build up of dry film lubricant coating flakes resulted from cohesive failure of the dry lubricant binder. The high hardness binder prevented the coating flakes from pulverizing into a powder, which enabled the coating flakes to interfere with roller bearing motion. Although a higher hardness binder could be used, the higher hardness would promote roller bearing slip and squeak, resulting in undesired noise. Moreover, testing has demonstrated that a mixture of polytetrafluoroethylene and molybdenum disulfide was not suitable as a dry lubricant for rolling track operations, such as those associated with the use of roller bearings of steel, for example, riding on metal tracks, there is a weakening of the binder of the molybdenum disulfide which promotes build up of dry lubricant flakes that prevent proper travel of the steel rollers in the tracks. In accordance with one aspect of the invention It has been discovered that the addition of the separate, non-stick top coating 82 permits the use of a higher hardness binder in the base coat which provides resistance to flaking and with the non-stick top coating preventing roller sliding to prevent squeaking. The top coating provides added tack to prevent the roller slippage to reduce squeak and prevent loss of timing caused by the roller sliding out of its rolling action fixed position. The top coating increases the contact area and forces the roller bearing to roll along rather than "plow" the base coating. The top coating is "smeared", or spread thin, during mechanism operation, exposing the underlying base coating which provides the lubrication under high load conditions.

In the exemplary embodiment, the base coating 81 has a uniform thickness in the range of 0.0002 to 0.0004 inches (5 to 10 micrometers) and the top coating 82 has a uniform thickness in the range of 0.0002 to 0.0005 inches (5 to 13 micrometers). The total thickness of the multilayer coating 80 is 0.0004 to 0.0009 inches (10 to 23 micrometers).

Prior to applying the coatings, the surfaces of the aluminum tracks are cleaned of oil, grease and particulate contamination prior to application of the base coating. The two layer coating is applied to the aluminum tracks using a dip coating or spray coating process to produce complete and uniform coverage covering the entire outer surface of the track. Alternatively, only the bearing surfaces may be coated, using a spray coating process, for example.

In the exemplary embodiment, a single coating is provided of the MOLYKOTE 106 and of the PTFE top coating in a two step coating process. First, the coating of the MOLYKOTE 106 is applied and cured in a convection oven at a temperature of approximately 175° C. (350° F.) for approximately 30 minutes. Then, the PTFE top coating is applied and cured. Preferably, the curing process for the PTFE coating includes flash drying for two minutes at a temperature in the range of about 65°–95° C. (150°–200° F.) followed by a 30 minute bake at 150° C. (300° F.). Alternatively, the base coating of: MOLYKOTE 106 may be partially cured and the top coat applied, and then the base coating curing can be completed while the PTFE top coating is being cured.

Horizontal Drive Mechanism

Referring again to FIGS. 1, 2 and 9, the horizontal drive motor 34 and transmission unit 35 are mounted to the upper track 19 of the outboard track sub-assembly and movable therewith. The horizontal drive nut 37 is mounted to the lower track 18 and is fixed relative to the upper track. The horizontal drive screw 36 is supported in the horizontal drive nut 37. The horizontal drive screw 36 is connected to the output of the transmission unit 35. The transmission unit 35 includes a worm W and a worm gear G which converts the rotational movement of the worm W of the bidirectional drive motor 34 to a low speed, high torque motion for rotating the horizontal drive screw 36 to drive the upper track fore-and-aft relative to the lower track. The drive screw 36 of the master drive mechanism 26 includes a travel limit stop assembly 94, shown in FIG. 9, at its proximal or forward end and a travel limit stop assembly 102, also shown in FIG. 9, at its distal or rearward end.

Figure 9:
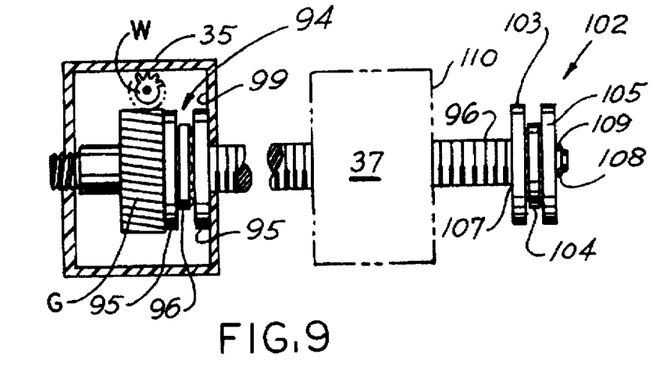
FIG. 9 is an enlarged fragmentary view of a portion of the horizontal drive screw of the horizontal drive mechanism, illustrating the anti-jamming mechanism in accordance with the invention.
Figure 10:
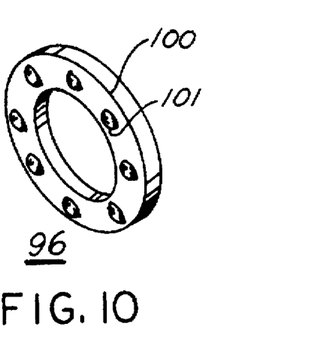
FIG. 10 is an enlarged perspective view of a bearing assembly of the anti-jamming mechanism of FIG. 9.

The travel limit stop assembly 94, which functions as an anti-jamming mechanism for maximum rear travel of the drive screw, is mounted on the drive screw adjacent to the worm gear G which is driven by the worm W. The travel limit stop assembly 94 includes a washer 95 and a ball bearing assembly 96 which is interposed between the washer 95 and the inner wall surface 99 of the housing of the transmission unit 35. The bearing assembly 96, shown in FIG. 10, includes an annular support 100 which is molded of plastic or steel and which has a plurality of ball bearings 101 molded or formed therein. The travel limit stop 94 prevents the drive motor from locking up when the drive screw is driven to the full rearward position because the ball bearing assembly is interposed between the washer and the transmission unit housing, so that the drive screw will not bind and the breakaway torque required to reverse the direction of drive of the horizontal drive screw is reduced, permitting the drive screw to be rotated away from its limit position.

Similarly, the travel limit stop assembly 102, which functions as an anti-jamming mechanism for maximum forward travel of the drive screw, includes an inner washer 103, a bearing assembly 104, and an outer washer 105. The bearing assembly 104 is the same in structure as bearing assembly 96 and includes an annular support 100 with ball bearings 101 molded into the disc. The drive screw has a non-threaded end portion 107 near its distal end on which are located the inner washer and the bearing assembly. The end of the drive screw shaft has a reduced diameter portion 108 defining a shoulder having a vertical surface against which the outer washer abuts. The outer washer is secured to the drive screw by an upset portion 109 of the drive screw that secures the outer washer between the upset end and the vertical surface defined by the reduced diameter end portion 108 of the shaft. The inner washer 103 and the bearing assembly 104 are free to rotate on the horizontal drive screw 36 with the ball bearings 101 engaging the inner surface of the inner washer 103 and the inner surface of the outer washer 105, providing a low friction surface between the two washers 103 and 105. The travel limit stop assembly 102 decreases the breakaway torque required to release the screw drive mechanism from its extreme stops. When the horizontal drive screw 36 is driven to its full forward extent, the outer surface of the inner washer 103 is drawn into engagement with the rearward outer surface 110 of the housing of the horizontal drive nut. However, because the inner washer 103 is coupled to the fixed outer washer 105 by the ball bearing assembly 104, the horizontal drive screw 36 will not bind so that it can be rotated away from its travel limit stop position when the direction of the horizontal drive is reversed.

Figure 11:
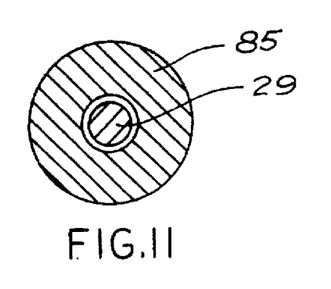
FIG. 11 is a section view taken along the line 11—11 in FIG. 1, illustrating the cross-section of the tube enclosing the flexible drive shaft of the horizontal slave drive mechanism.
Figure 12:
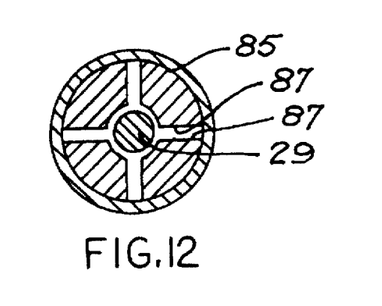
FIG. 12 is a view similar to FIG. 11, but illustrating an alternative cross-section for the tube.

The shaft of the horizontal drive motor is coupled to the slave transmission unit 38 by the flexible shaft 29 which is enclosed within a guard tube 85. The inner diameter of the tube 85 is sized to be slightly greater than the outer diameter of the flexible shaft, as shown in FIG. 11, to permit the flexible shaft to rotate freely, but within a somewhat confined space. Alternatively, the guard tube may have the cross-section illustrated in FIG. 12 which includes a plurality of inwardly directed wedge-shaped shaft guide portions 87 which extend toward the flexible shaft 29. In either case, the close matching of the inner diameter of the tube to the outer diameter of the flexible shaft minimizes movement of the flexible shaft within the tube to minimize noise associated with movement of the shaft relative to housing of the motor 34 and relative to the housing of the transmission unit 38 during horizontal drive operations. The respective ends 85a and 85b of the guard tube 85 are maintained in place in the motor housing and in the housing of the transmission unit 38 housing by ferrule clips 88 which prevent the ends of the tube from being pulled out of the motor housing or the transmission unit housing inadvertently. Without the retaining clips 88, the ends of the tube 85 could be pulled out if, for example, someone attempting to lift the seat adjuster unit uses the guard tube 85 as a handle.

Figure 13:
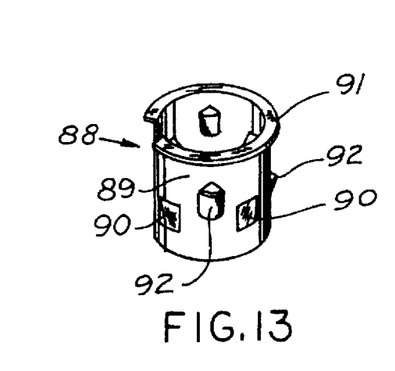
FIG. 13 is a perspective view of a ferrule clip which secures the tube to the housings of the drive motor and the transmission unit.
Figure 14:
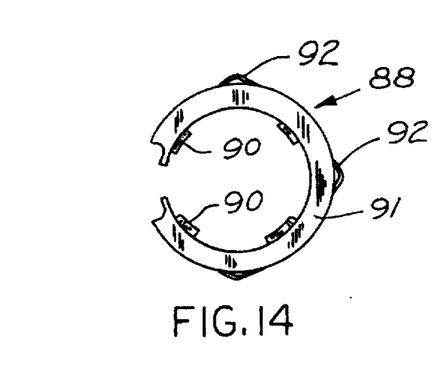
FIG. 14 is a top view of the ferrule clip of FIG. 13.

Referring to FIGS. 13 and 14, each ferrule clip 88 is made of metal and includes a generally cylindrical sidewall 89 having a plurality of inwardly directed barbs 90 and a plurality of outwardly directed barbs 92 formed in the sidewall. The ferrule clip 88 has a flange 91 at one end thereof. The outer diameter of the ferrule clip 88 corresponds to the inner diameter of the outlet of the motor housing and to the inner diameter of the housing of the transmission unit 38. The inner diameter of the ferrule clip 88 corresponds to the outer diameter of the guard tube 85. To install the ferrule clips 88, one end to the guard tube 85 is inserted into one of the clips 88 and the other end of the guard tube 85 is inserted into another clip 88. Then, one of the clip bearing tube ends is inserted into the output opening 86 of the drive motor and, with the flexible shaft 29 extending through the tube, the other clip bearing tube end is inserted into the input opening 86a of the transmission unit 38. If, for any reason, either end of the tube is drawn outwardly, the inwardly directed barbs 90 will dig into the outer surface of the guard tube which is made from a soft plastic material. At the same time, the outwardly directed barbs 92 will be drawn into engagement with the material forming the inner diameters of the output of the drive motor housing and the input of the transmission unit housing, preventing the guard tube from being drawn out of either housing.

Referring again to FIGS. 1, 2 and 9, the drive screw 39 of the slave drive mechanism includes a travel limit stop assembly corresponding in structure and function to a travel limit stop assembly 94 at its proximal or forward end. However, the slave drive mechanism does not include a travel limit stop assembly at its distal or rearward end. The limit of travel of the slave drive mechanism is controlled by the horizontal master drive mechanism. That is, when the drive screw of the horizontal master drive unit reaches its full forward end of travel stop and the driven unit is stopped, the slave drive mechanism is stopped also. The limit of travel of the slave drive mechanism is determined by the master drive mechanism. The use of the travel limit stop of the horizontal master drive mechanism to establish the forward limit of travel for the horizontal slave drive mechanism eliminates the potential for horizontal matchboxing, which is the over travel of the inboard or slave track section relative to the outboard or driven track section after the outboard track section has reached the full forward end of travel stop. In known power seat adjusters in which the driven and slave horizontal drive mechanisms both include end of travel stops, there is a possibility of matchboxing occurring due to tolerance variations on the horizontal drive mechanisms and the flexible drive shaft linking the horizontal master drive mechanism 24 and horizontal slave drive mechanism 25.

Vertical Drive Mechanism

Referring to FIGS. 15–19, the vertical drive nut 44 of the front vertical drive mechanism 30 is molded from thermoplastic glass fiber reinforced material and each include a molded-in metal insert 115. By way of example, the thermoplastic material includes 30% long glass fibers for strength. Forming the vertical drive nuts 44 partially of plastic results in reduced weight for the vertical drive nuts 44 as compared to a drive nut that is made totally of metal. The insert 115 is made of steel to provide the strength needed in the pivot end portion 116 and also around the periphery of the vertical drive nut 44.

Figure 15:
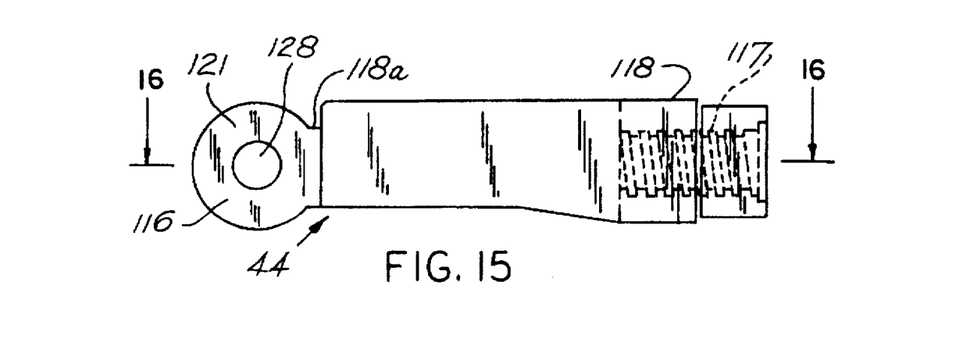
FIG. 15 is a side view of the vertical drive nut of the vertical drive mechanism.
Figure 16:
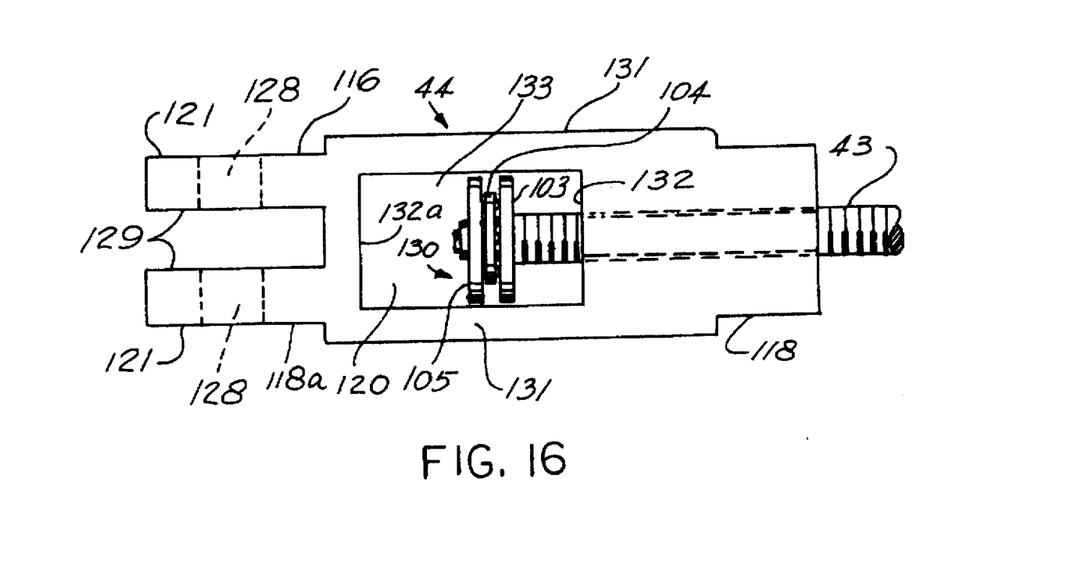
FIG. 16 is a top view of the vertical drive nut.
Figures 17, 19:
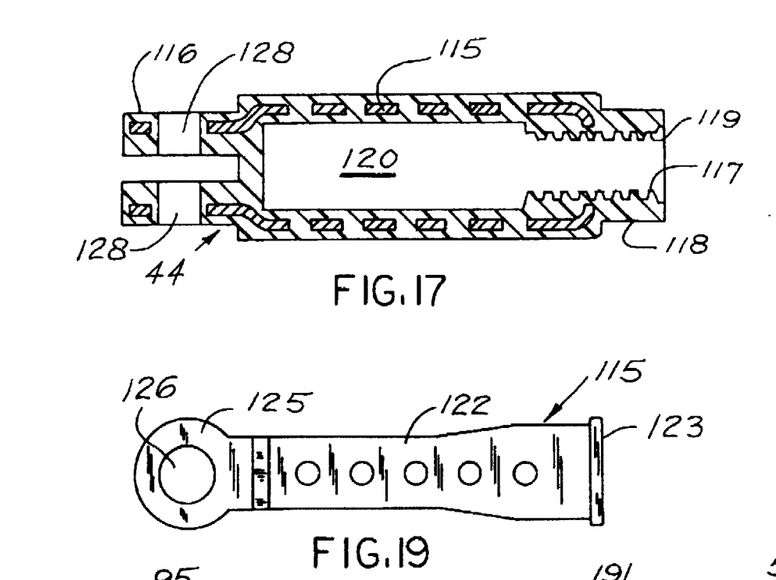
FIG. 17 is a section view taken along the line 17—17 of FIG. 15 of the vertical drive nut and illustrating the vertical drive screw.
FIG. 19 is a side view of the metal insert of the vertical drive nut.

The vertical drive nut has screw threads 117 molded into a portion of the plastic body at one end 118 which are engaged by the threads of the vertical drive screw 43. The vertical drive nut 44 includes an upwardly opening cavity 120 in which the distal end of the vertical drive screw 43 is exposed. The cavity 120 is defined by sides 131, a rearward wall 132, a forward wall 132a and a bottom wall 133 which provide axial strength and greater torsional stiffness for the vertical drive nut to eliminate "stick-slip" which is caused by the vertical drive nut 44 twisting about its axis when it is driven. In addition, a grease pocket 119 is molded into the body portion the threaded end portion. The integral plastic threads provide low noise and low running friction resulting in greater efficiency. As shown in FIGS. 15–17, the pivot end portion 116 of the vertical drive nut 44 is defined by a pair of annular projections 121 which extend from the forward wall 132a in a parallel spaced relation at the other end 118a of the drive screw, defining a slot 127 for receiving the end of the drive link 46 (FIG. 1). Each portion 121 has an aperture 128 to facilitate connection of the vertical drive nut 44 to the drive link 46 (FIG. 1).

Figure 18:
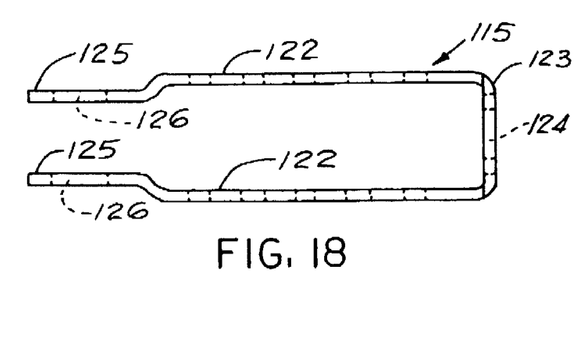
FIG. 18 is a top view of the metal insert of the vertical drive nut.

As shown in FIGS. 18 and 19, the metal insert 115 is a one piece member that is bent over in a U-shaped form, defining parallel extending spaced apart legs 122. The legs are interconnected at one end of the insert by a rectangular portion 123 having an aperture 124 through which passes the drive screw 43. At the other end of the insert, each leg includes a flat, annular end portion 125 which define a molded-in reinforcement for the pivot end portion 116 of the vertical drive nut 44. Each annular end portion 125 has an aperture 126, the diameter of which is greater than that of aperture 128. Because the pivot end portion 116 includes plastic material molded around the metal insert 115, the plastic side surfaces 129 of the vertical drive nut 44 are in engagement with the metal surface of the drive link 46 so that a plastic-to-metal interface is provided. Also, because the diameters of apertures 126 are greater than those of apertures 128, there is no metal-to-metal contact with the pins that secure the drive nut to the link. The plastic-to-metal interface between the vertical drive nut and the drive link reduces noise during vertical lift operations.

Referring to FIG. 16, the open side of the cavity 120 exposes the distal end of the drive screw, facilitating assembly of a travel limit stop assembly on the drive screw. The vertical drive nut 44 includes a travel limit stop assembly 130 which is the same in structure and function as the travel limit stop assembly 102 of the horizontal drive screw, and corresponding parts of the travel limit stop assembly 130 have given the same reference numerals as corresponding parts of travel limit stop assembly 102. As the vertical drive screw is being driven towards its fully extended position, the travel limit stop assembly 130 is moved toward inner wall 132 and when the vertical drive screw 43 is fully extended, the inner washer 103 engages the wall 132. The bearing assembly 104, which is interposed between the inner and outer washers, prevents the drive screw 43 from jamming, allowing it to be rotated away from its end of travel positions.

The transmission unit 42 of the vertical drive mechanism also includes a travel limit stop assembly (not shown) that is identical in structure and operation to travel limit stop assembly 94 for the horizontal drive mechanism shown in FIG. 9, for providing an anti-jamming mechanism in the fully retracted position of the vertical drive screw, such travel stop limit mechanism being located within the housing of the transmission unit 42, mounted on the vertical drive screw adjacent to the worm gear of the transmission unit.

The vertical drive screw 43 is fixed to the upper track and the vertical drive nut 44 is movable axially of the vertical drive screw pivot the drive link aft-and-fore, thereby rotating the torsion tube 45 clockwise and counterclockwise, respectively, as viewed from the inboard side of the seat assembly. As the torsion tube 45 is rotated clockwise, the outboard and inboard links 47 and 48 are pivoted clockwise, raising the forward end of the support. As the torsion tube 45 is rotated counterclockwise, the outboard and inboard links 47 and 48 are pivoted counterclockwise, lowering the forward end of the support structure.

The structure and operation of the vertical drive nut of the rear vertical drive mechanism 31 which provides vertical repositioning of the back end of the seat support is substantially the same as that for the front vertical drive mechanism 30 and accordingly, corresponding elements have been given the same reference numerals.

Recliner Drive Mechanism

Referring to FIGS. 20–24, the recliner drive nut 55 is molded from thermoplastic glass fiber reinforced material and includes a molded-in metal insert 140. The recliner drive nut 55 moves fore-and-aft along the recliner drive screw 54 as the drive screw 54 is rotated clockwise and counterclockwise by the reversible recliner drive motor 52. Forming the recliner drive nut 55 mostly of plastic results in reduced weight for the recliner drive nut 55 as compared to a drive nut that is made totally of metal. The metal insert 140 is made of steel to provide the strength needed in the pivot end portion 142 of the recliner drive nut 55 and also around the periphery of the drive nut 55 and axial strength for the recliner drive nut.

Figures 20, 21:
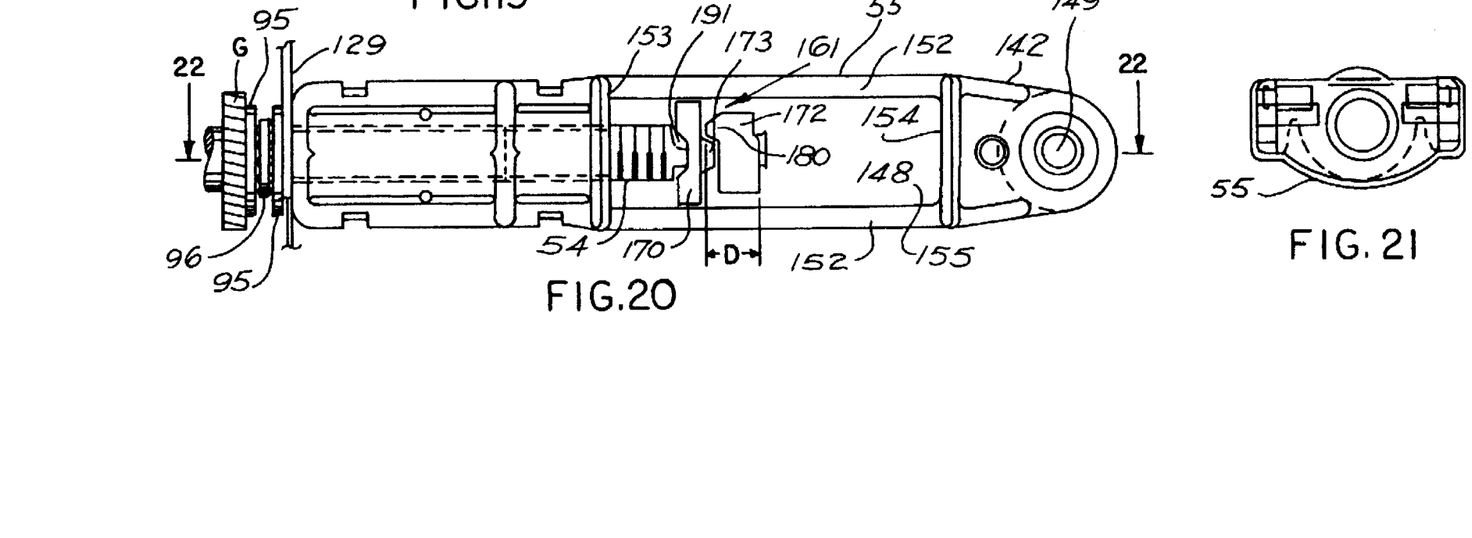
FIG. 20 is side view of the recliner drive nut of the recliner drive mechanism, and illustrating the recliner drive screw.
FIG. 21 is an end view of the recliner drive nut.
Figure 22:
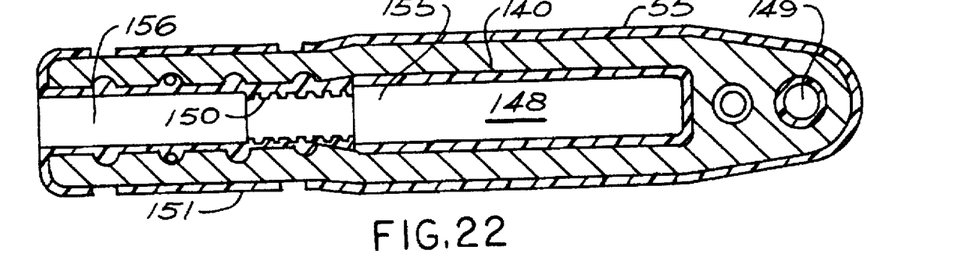
FIG. 22 is a section view taken along line 22—22 of FIG. 20.

The recliner drive nut has screw threads 150 molded into a portion 151 of the plastic body near one end which are engaged by the threads of the recliner drive screw 54. The drive nut 55 has a cavity 148 which opens to one side of the drive nut 55. The distal end of the drive screw 54 is exposed in the cavity. The cavity 148 is defined by top and bottom walls 152, a forward inner wall 153, a rearward inner wall 154 and a side wall 155 which provide axial strength and torsional stiffness for the drive nut 55 to eliminate "stickslip" which is caused by twisting of the drive nut 55 about its axis during rotation of the recliner drive screw 54. In addition, a grease pocket 156 is molded into the body portion through which the recliner drive screw extends. The integral plastic threads provide low noise and low running friction resulting in greater efficiency. The pivot end portion 142 of the recliner drive nut has an aperture 149 therethrough to facilitate connection of the recliner drive nut 55 to the seat back bracket (not shown) in the manner known in the art.

Figure 23:
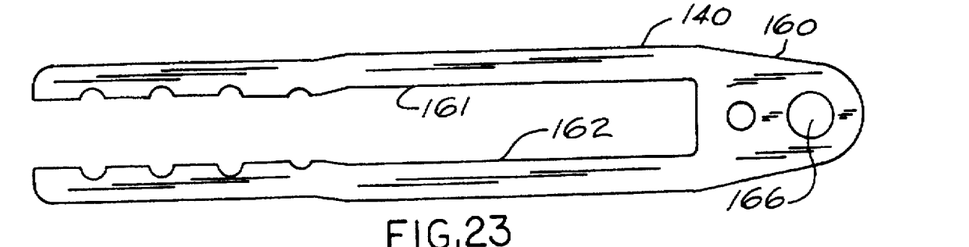
FIG. 23 is a side view of the metal insert of the recliner drive nut.
Figure 24:
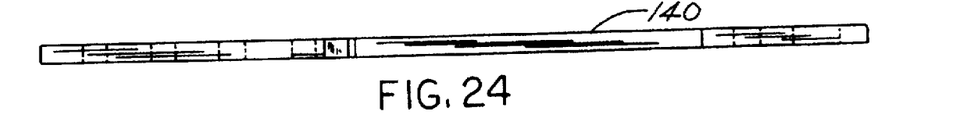
FIG. 24 is a top view of the metal insert of the recliner drive nut.

As shown in FIGS. 23 and 24, the metal insert 140 is a thin, one-piece member that has a forked configuration, somewhat in the shape of a clothespin, with an end portion 160 and parallel extending, spaced apart legs 161 and 162 extending from the end portion 160. The end portion 160 defines a molded-in reinforcement for the pivot end portion 142 of the recliner drive nut 55 that connects to the seat back frame (not shown). The end portion 160 has an aperture 166 aligned with aperture 149 in the plastic body portion of the pivot end portion 142. The diameter of aperture 166 is greater than the diameter of aperture 149 so that there is no contact between the reinforcement insert 140 and the pin that secures the drive nut to the seat back mounting bracket.

Referring to FIGS. 20 and 25–30, the open side of the cavity 148 exposes the distal end of the recliner drive screw 54, facilitating assembly of a radial stop mechanism 161 on the end of the recliner drive screw 54. The radial stop mechanism 161 includes a guide collar 170 and a stop member 172 which cooperate to define an anti-jamming, end of limit travel stop for the recliner mechanism for preventing the recliner screw drive mechanism from jamming when the drive screw reaches its fully extended stop position. The recliner drive mechanism also includes a travel limit stop mechanism that is similar in structure and operation to travel limit stop assembly 94 for the horizontal drive mechanism (FIG. 9) for providing an anti-jamming function at the fully retracted position of the recliner drive screw. As shown in FIG. 20, the travel stop limit mechanism, which has been given the reference numeral 94, includes washers 95 and bearing assembly 96 located between the washers which are mounted on the recliner drive screw between the worm gear G and a mounting plate 179 which secures one end of the recliner drive nut to the housing of the transmission unit 53 (FIG. 2). One of the washers 95 bears against the mounting plate 179 when the recliner drive screw is driven to its fully retracted position.

Figure 25:
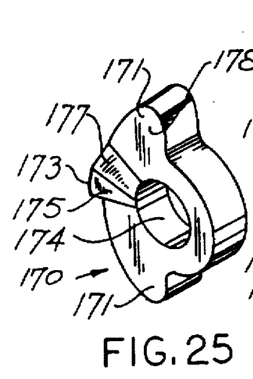
FIG. 25 is an isometric view of the guide member of the radial stop of the recliner drive mechanism.
Figure 26:
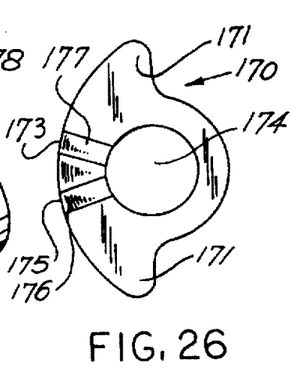
FIG. 26 is a plan view of the guide member of FIG. 25.
Figure 27:
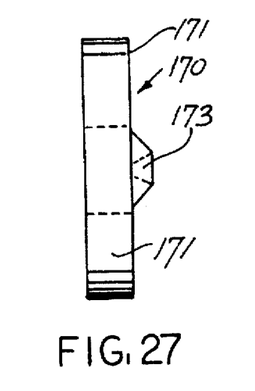
FIG. 27 is an end view of the guide member of FIG. 25.

As shown in FIGS. 25–27, the guide collar 170 includes a pair of side arms 171 and projection or nub 173. The projection 173 has a generally triangular shaped side surface 175 with portions 176 and 177 which are substantially rectangular, generally planar in shape and which slope inwardly to the rearward surface 178 of the guide collar at an angle of approximately 45° relative to the axis of the guide collar, and thus to the axis of the drive screw when the guide collar is in place mounted on the drive screw. The guide collar 170 includes an aperture 174 through which passes the recliner drive screw 54. The guide collar 170 is carried on the recliner drive screw 54, but the outwardly projecting side arms prevent rotation of the guide collar within the chamber 148. The guide collar 170 is assembled on the recliner drive screw 54 oriented with the projection directed rearwardly and located at the open side of the cavity. The guide collar is made of a hard material, preferably steel, although certain plastic materials are suitable for this purpose.

Figure 28:
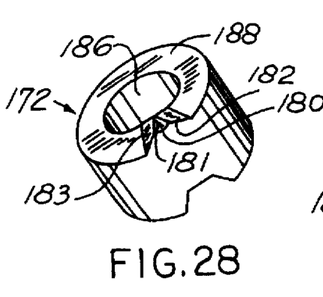
FIG. 28 is an isometric view of the collar of the radial stop.
Figure 29:
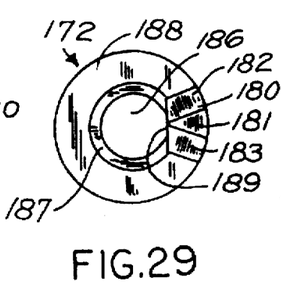
FIG. 29 is a plan view of the collar of FIG. 28.
Figure 30:
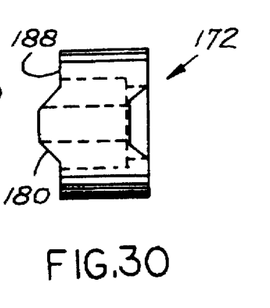
FIG. 30 is an end view of the collar of FIG. 28.

As shown in FIGS. 28–30, the stop member 172 is a generally cylindrical member having a bore 186 therethrough and has a counterbore 187 at the side 188 that is located adjacent to the guide collar. The stop member 172 is fixed to the end of the recliner drive screw 54 and the diameter of the counterbore 187 corresponds to the diameter of a non-threaded portion of the drive screw 54, the end of the drive screw having a portion of a reduced diameter that corresponds to the diameter of the bore 186. The counterbore is formed with a flat 189 for indexing the stop member 172 with the recliner drive screw 54 which has a mating flat 191 shown in FIG. 20. The projection or nub 180 of stop member 172 is similar in shape to projection 173 of guide collar 170 and includes triangular shaped side surface 181 and surfaces 182 and 183 which are substantially rectangular, generally planar in shape and which slope inwardly toward front surface 188 of the stop member at an angle of approximately 45° relative to the axis of the stop member, and thus to the axis of the drive screw when the stop member is in place mounted on the drive screw. The projection 180 extends outwardly and forward from its side 188 from a location that is adjacent to the flat 189. The projection extends forwardly so that surface 183 is brought into engagement with surface 177 of projection 173 as the drive screw 54 is driven to move the drive nut 55 to its rear stop limit. The stop member is made of a hard material, preferably steel, or a suitable hard plastic material. The radial stop mechanism provides small contact area that is defined by interfering projections or nubs 173 and 180 on the guide collar 170 and the stop member 172, respectively, as compared to flat-to-flat as when an annular surface of one member engages an annular surface of a the cooperating member.

Timing is defined-by the flat 189 on the stop member and a corresponding flat on the end of the drive screw 54 which orients the stop member on the drive screw with the projection 180 located a predetermined axial distance "D" from the end of the drive screw 54. This distance "D" is a function of the pitch of the screw thread of the drive screw 54 and corresponds to the axial separation which provides minimum clearance between the projection 180 and the projection 173, allowing the projection 180 to just barely pass the projection 173 of the guide collar on the next to final revolution of the drive screw 54 toward its fully extended position. This ensures that the two projections 180 and 173 are in close proximity to one another on the next to last revolution, but without interference between opposing surfaces of the two projections, and that surface 183 engages surface 177 at the end of the final revolution.

Figure 31:
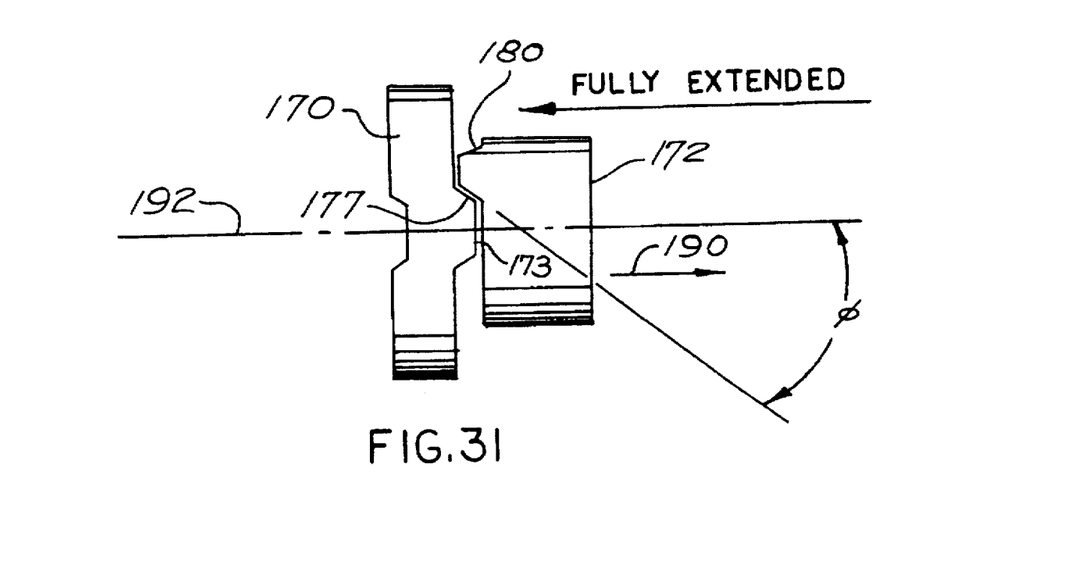
FIG. 31 is a simplified representation of the radial guide illustrating the angle of friction between engaging surfaces of the guide member and the collar.

In operation, assuming that the drive screw is being rotated towards its fully extended position, as the drive screw is rotated, the guide collar 170 initially is free to "float" axially on the recliner drive screw 54 and the stop member 172 turns with the recliner drive screw 54. As the end of travel limit position is approached, the guide collar engages the inner front wall 153 of the cavity 148 so that the guide collar can no longer move axially as the recliner drive screw 54 is rotated. On the next to the last revolution before end of travel is reached, the projection 180 of stop member 172 is moved to be juxtaposed with the projection 173 on the guide collar 170, but its surface 181 just clears surface 175 on the next to last revolution of the recliner drive screw 54. On the last revolution of the recliner drive screw 54, the projection 180 is moved further toward the guide collar and its surface 183 is moved into engagement with the surface 177 of the projection 173 on the guide collar 170 when the fully extended position is reached, as is illustrated in FIG. 31.

At the fully extended position, the radial stop mechanism 161 provides a positive stop with minimum contact between the mating portions of the mechanism. That is, the amount of contact is defined by the relatively small surfaces 177 and 181 of projections 173 and 180 on the two elements that form the radial stop mechanism. Moreover, the engaging surfaces 177 and 183 extend at an angle φ of approximately 45° relative to the axis 192 of the recliner drive screw which is significantly greater than the static angle of friction for steel on steel, reducing the breakaway torque required to reverse the direction of drive of the recliner drive screw. As has been indicated, the guide collar and the stop member are preferably made of steel. For steel on steel, the friction force reaches its limiting static value when the static angle of friction is about 6°. Because the engaging surfaces 177 and 183 of the radial stop mechanism 161 extend at an angle that is significantly greater than the angle of static angle of friction for steel on steel, the effects of friction become negligible. Consequently, with this radial stop mechanism, only a small torque force is required to reverse the direction of drive of the recliner drive screw 54 to move the recliner drive nut away from the fully extended position, and moving the stop member in the direction of the arrow 190 in FIG. 31, out of engagement with the guide collar.

Summary

Thus, it has been shown that the present invention provides a seat adjuster that is characterized by low noise, low cost, and smooth operation. The bearing surfaces of the tracks that are engaged by the roller bearings are crowned to provide a slightly convex bearing surface for the roller bearings under no load conditions, that is, when the vehicle seat is unoccupied, and which deflect to approach a flat surface condition when the seat is occupied. In addition, the bearing surfaces are coated with a multilayer dry film coating that includes a base coating of a high load, high hardness anti-friction coating that provides the necessary load bearing capability and a top coating of an anti-stick material that prevents slipping of the rollers for eliminating roller noise.

The vertical, horizontal and recliner drive assemblies each include molded plastic, glass-fiber reinforced drive nuts 44 that have a molded-in metal insert. This construction minimizes the weight of the drive nuts, without sacrificing strength. The horizontal drive mechanism, the vertical drive mechanism and the recliner drive mechanism each include travel limit stops having anti-jamming mechanisms that lower the breakaway torque from either end position of the drive screw. The travel limit stop mechanism that is associated with the horizontal drive controls the slave drive mechanism to eliminate the possibility of matchboxing. For the recliner drive assembly, the breakaway torque is reduced through a radial stop mechanism having mating surfaces so oriented as to exceed the angle of static friction whereby the effects of friction become negligible. Although the invention has been described with reference to preferred embodiments, it is apparent that changes and modifications are possible without departing from the spirit and scope of the invention as defined by the following claims.

We claim:
1. A seat adjuster for a vehicle seat assembly, comprising:
   at least one track assembly including a lower track and an upper track, said upper track being mounted on said lower track and adapted for horizontal for-and-aft movement relative to said lower track; each of said tracks having an elongated bearing surface having first and second sides;
   bearing means interposed between said upper and lower tracks of said track assembly, said bearing means including at least one generally cylindrical roller bearing extending transversely of and engaging said bearing surfaces of said upper and lower tracks between the first and second sides of said bearing surfaces;
   the bearing surface of at least one of said upper and lower tracks being crowned between said first and second sides to provide a convex bearing surface for said one track, whereby in the absence of a load, said convex bearing surface bows outwardly between said first and second sides toward said roller bearing so that said roller bearing engages only a portion of said convex bearing surface intermediate said first and second sides, and when the load is coupled to a said convex bearing surface, said convex bearing surface deflects away from said roller bearing surface and becomes nearly flat from side to side so that said roller bearing contacts said convex bearing surface over substantially the entire width of the bearing surface, thereby providing a substantially even distribution of the load across the width of said one track;
   and a multi-layer dry film lubricant coating on at least one of said bearing surfaces, said dry film lubricant coating including a base coating of a mixture of solid lubricants dispersed in an organic binder and solvents and a top coating of a material from the group consisting of paraffin, polyethylene and polytetrafluoroethylene.

2. The seat adjuster according to claim 1 wherein said solid lubricants include molybdenum disulfide and graphite, and wherein said organic binder is a thermoset heat cured binder.

3. The seat adjuster according to claim 1, wherein the thickness of said base coating is in the range of about 0.0002 to 0.0004 inches.

4. The seat adjuster according to claim 1, wherein the thickness of said top coating is in the range of about 0.0002 to 0.0005 inches.

5. The seat adjuster according to claim 1, wherein the thickness of said multilayer coating is in the range of about 0.0004 to 0.0009 inches.

6. A seat adjuster for a vehicle seat assembly, comprising:

at least one track assembly including a lower track and an upper track, said upper track being mounted on said lower track and adapted for horizontal for-and-aft movement relative to said lower track; each of said tracks having an elongated bearing surface having first and second sides;

bearing means interposed between said upper and lower tracks of said track assembly, said bearing means including at least one generally cylindrical roller bearing extending transversely of and engaging said bearing surfaces of said upper and lower tracks between the first and second sides of said bearing surfaces; and the bearing surface of at least one of said upper and lower tracks having a crowned surface between said first and second sides to provide a convex bearing surface for said one track, whereby in the absence of a load, said convex bearing surface bows outwardly between said first and second sides toward said roller bearing so that said roller bearing engages only a portion of said convex bearing surface intermediate said first and second sides, and when the load is coupled to said convex bearing surface, said convex bearing surface deflects away from said roller bearing surface and becomes nearly flat from side to side so that said roller bearing contacts said convex bearing surface over substantially the entire width of the bearing surface, thereby providing a substantially even distribution of the load across the width of said one track.

7. The seat adjuster according to claim 6, wherein said crowned surface extends the width of said bearing surface and has an arcuate cross-section.

8. The seat adjuster according to claim 7, wherein the thickness of said crowned surface is in the range of about 0.005 to 0.0014 millimeters at the center of its arcuate cross-section.

* * * * *